(12) United States Patent
Brisson

(10) Patent No.: US 7,685,801 B2
(45) Date of Patent: Mar. 30, 2010

(54) METHOD AND APPARATUS FOR PRESCRIBING AND MANUFACTURING A CORRECTIVE HORSESHOE

(76) Inventor: Dennis Brisson, 36591 Nichols Ave., Fremont, CA (US) 94536

(*) Notice: Subject to any disclaimer, the term of this patent is extended or adjusted under 35 U.S.C. 154(b) by 284 days.

(21) Appl. No.: 11/685,768

(22) Filed: Mar. 14, 2007

(65) Prior Publication Data

US 2009/0044511 A1 Feb. 19, 2009

Related U.S. Application Data

(60) Provisional application No. 60/782,557, filed on Mar. 14, 2006.

(51) Int. Cl.
*B21K 15/02* (2006.01)
(52) U.S. Cl. .................. 59/61; 59/36; 59/66; 168/4; 168/5
(58) Field of Classification Search .............. 59/36, 59/38, 44, 49, 52, 55, 56, 58, 61, 62, 64; 168/4, 5, 45
See application file for complete search history.

(56) References Cited

U.S. PATENT DOCUMENTS

| 3,874,165 | A | * | 4/1975 | Dawson | 59/56 |
| 4,910,955 | A | * | 3/1990 | Corsello | 59/59 |
| 5,319,918 | A | * | 6/1994 | Baur et al. | 59/61 |
| 6,502,642 | B2 | * | 1/2003 | Ahrens | 168/45 |
| 7,088,847 | B2 | * | 8/2006 | Craig et al. | 59/61 |
| 7,409,818 | B2 | * | 8/2008 | Llewellyn | 168/5 |

* cited by examiner

*Primary Examiner*—David B Jones

(57) ABSTRACT

A method and apparatus for manufacturing a shoe for an animal is disclosed. The hoof of an animal may be aligned to a pre-determined position. The animal may then be examined against a criteria. It is then determined whether the bone structure of the animal satisfies the criteria. The hoof may be re-aligned to a different pre-determined position if the criteria is not satisfied. A shoe is then manufactured for the animal according to position data corresponding to a satisfactory position.

2 Claims, 17 Drawing Sheets

Special Order

Send last shoes from horse and we will duplicate the shape and nail hole location. Including any add on's, angle, side break over, toe break over, corn relief, relieved area for quarter bar cracks or other feature.

Trace the shoe and nail hole location on paper.
Mail, or e mail traced shoe, or send the original shoe from horse, and we will create a shoe as close as possible.

FIG. 6G

METHOD AND APPARATUS FOR PRESCRIBING AND MANUFACTURING A CORRECTIVE HORSESHOE

CROSS-REFERENCE TO RELATED APPLICATIONS

This application claims the benefit of U.S. provisional application No. 60/782,557, filed Mar. 14, 2006.

BACKGROUND

The art of shoeing horses is an old and often mysterious craft. In fact, the meaning of the term "farrier" has changed dramatically over the centuries from a horse doctor to a person who shoes horses. Many people are often surprised by the volume of treatments and remedies found in old farriery books. However, there is generally a lack of information on horseshoeing.

Farriers generally shoe horses for many reasons, such as protection for the hoof, to enhance performance, or for therapeutic reasons. In the case of a therapeutic shoe, features can be included in the shoe for corrective reasons to help make a horse sound, to relieve pain, and to correct for problems in the suspensory confirmation of a particular horse.

As is known by those of ordinary skill in the art, the front feet of a horse carries 65% of the load during movement, with the rear feet responsible for the 35% balance. Hence, health problems in horses tend to manifest in the front hooves rather than the rear hooves due to the increased load.

However, no system exists to allow qualified personnel such as a veterinarian to examine a horse and prescribe a corrective shoe in a standardized manner.

BRIEF DESCRIPTION OF THE DRAWINGS

FIGS. 6A-6H are illustrative web pages for the specification and ordering of a corrective horseshoe configured in accordance with the teachings of this disclosure.

DETAILED DESCRIPTION

Figure 1:
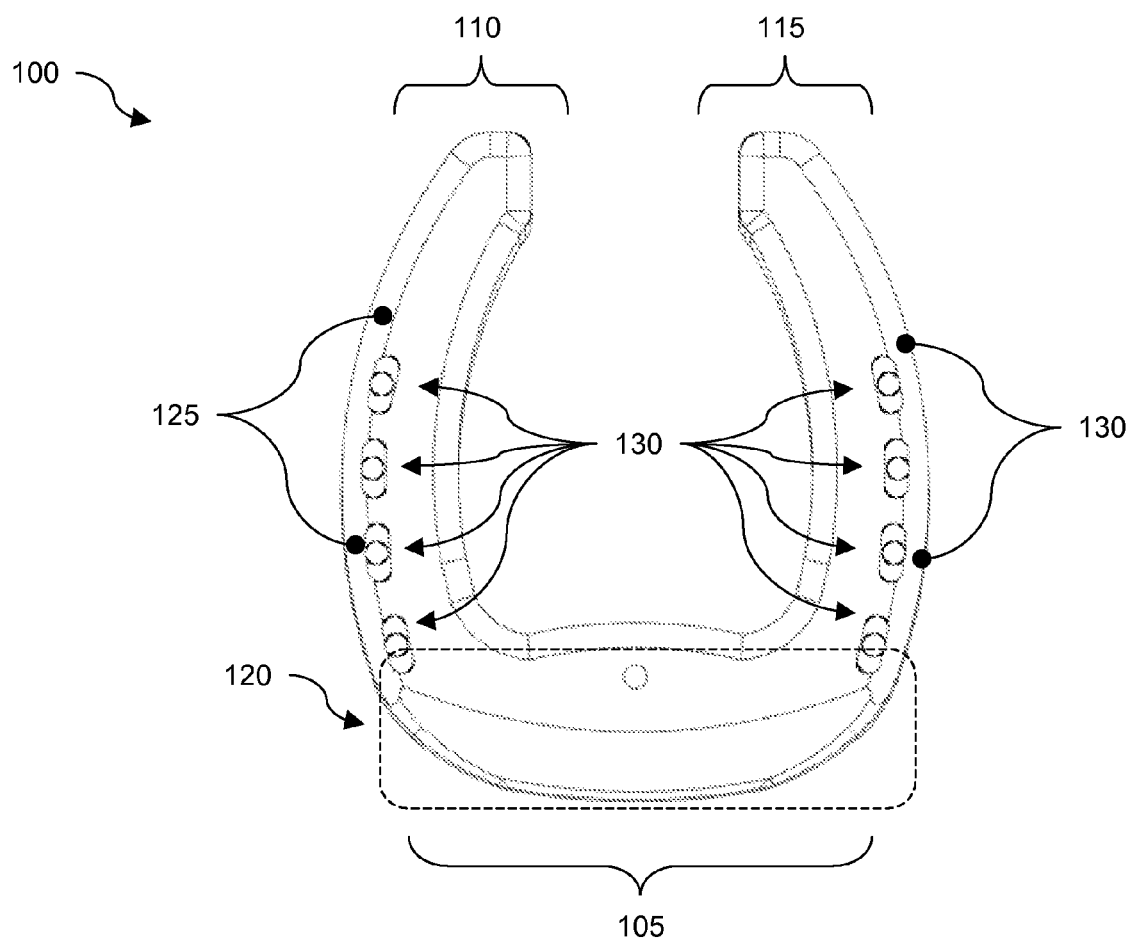
FIG. 1 is a top view of a corrective horseshoe configured in accordance with the teachings of this disclosure.

FIG. 1 is a bottom view of a horseshoe 100 configured in accordance with the teachings of this disclosure. Generally speaking, the horseshoe 100 is comprised of a forward toe portion 105 extending into a pair of opposing branches 110 and 115. A plurality of nail pathways 130 are provided for affixing the shoe 100 to the hoof of a horse.

One problem corrected by the horseshoe of this disclosure is caused by the shoe's position relative to the coffin bone of the horse's foot. If the shoe is affixed too far forward, additional strain is placed on the hoof in a manner like having a shoe that is too long. As a result, the toe of the hoof never properly rolls over. As a horse is "push" animal, i.e., it propels itself by pushing, rather than pulling, improper toe rollover places undue strain on the hoof as the hoof remains in the ground too long.

A common problem that exacerbates this problems is that some farriers typically tend to follow the toe of the hoof as it naturally grows forward, and eventually the heel stops growing with the toe. When the rollover occurs too late, this can cause the rear hoof to catch up with the front hoof during motion, possibly causing the hoofs to collide, potentially laming the horse.

Typically, farriers will remove portions of the hoof by rasping and "rolling" up the front of the horseshoe during formation.

Within the hoof and leg structure, there is an optimal placement for each bone. Over time, natural wear takes place, along with incorrect shoeings, resulting in a change of this optimal structure. The present disclosure provides for a corrective horseshoe that may reposition the bones with the goal of duplicating as close as possible the optimal structure by incorporating several different options into one shoe that will provide the support that both time and human intervention have changed.

The present disclosure provides for a wide variety of angles to correct problems, along with the option of heal and frog support for the long term correctional problems. It is contemplated that many levels of breakover, side breakover, and rolled toe option may be provided. Each option can be made to a predetermined degree or measurement, and the shoes of this disclosure may be ordered with any combination of options.

The present disclosure provides for an order form that allows a user to choose the type and size of shoe, along with characteristics such desired angle, special angles needed for inside or outside of branch, side breakover, rolled toe option and side breakover special. By incorporating different options in a shoe, a farrier may correct an observed problem, but may also prevent future problems common with traditional correctional shoeings.

Figure 2:
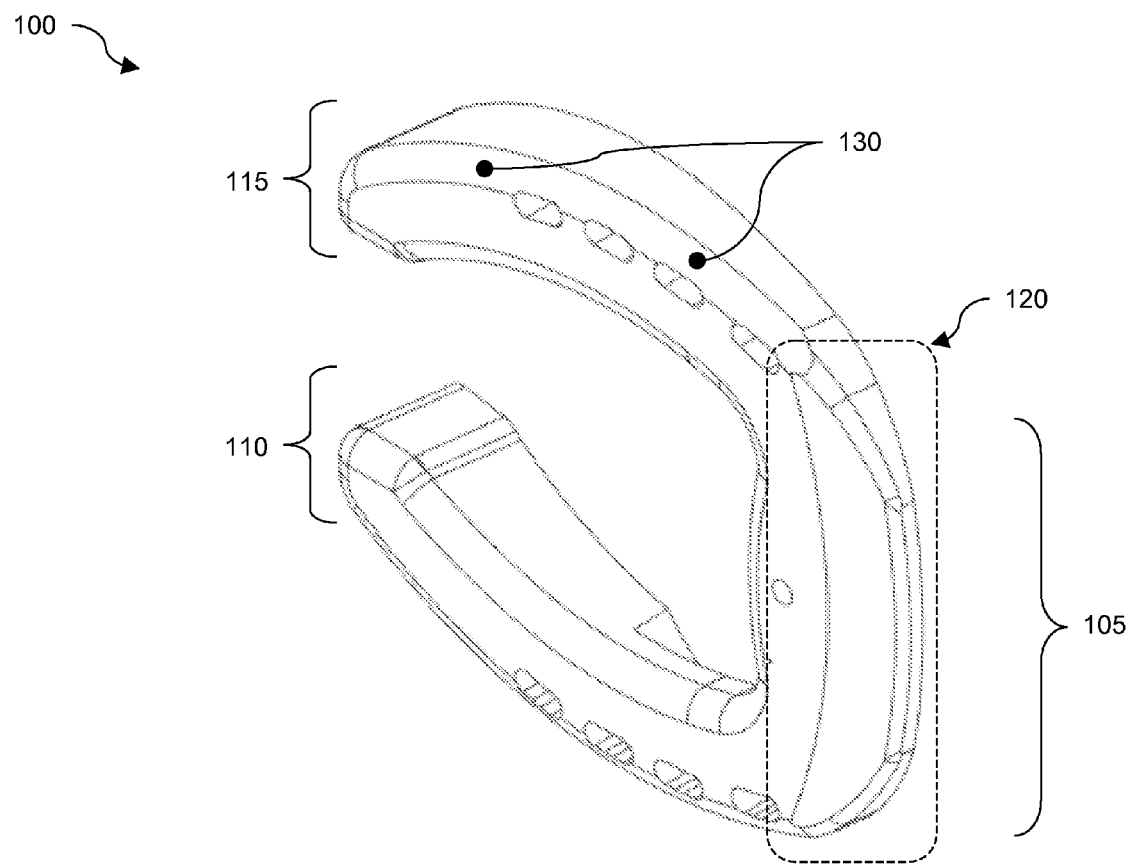
FIG. 2 is a perspective view of a corrective horseshoe configured in accordance with the teachings of this disclosure.

Referring now to FIGS. 1 and 2, a toe rollover portion is shown formed in the toe portion 105 of the horseshoe 100. In preferred embodiments, the rollover portion 120 is formed to duplicate the natural wear of a shoe when shod on a horse.

To determine a proper natural wear pattern, a shoe formed of softer aluminum may be put on horses for a time and the natural wear pattern may be observed. To account for where shoes may be placed relative to the coffin bone, test shoes may be affixed in different locations relative to the coffin bone, and these wear patterns may be observed. Additionally, the shoe may be re-fitted in different locations relative to the coffin bone, and the resulting wear patterns observed to determine wear patterns for particular scenarios on a particular horse.

Thus, a catalog of pre-worn wear patterns can be generated, using different types of horses shod differently.

In a preferred embodiment, a survey of the wear pattern of test shoes reveals that the natural wear of a worn shoe is not a flat surface with a sharp edge. Rather, the natural wear process results in a surface defined by a series of ever-decreasing radii terminating with the forward toe in a gentle radius.

Figure 3:
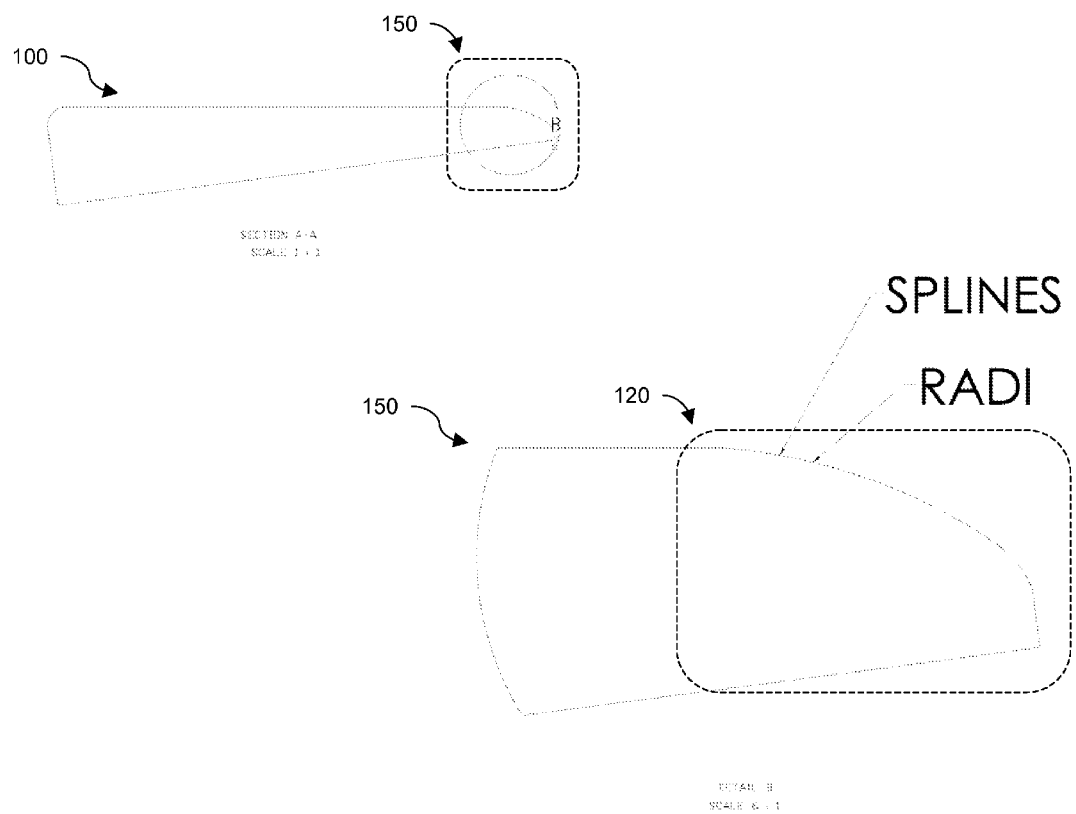
FIG. 3 is a detailed view of a toe rollover portion for a corrective horseshoe configured in accordance with the teachings of this disclosure.

Referring briefly to FIG. 3, a detail view of a horseshoe 100 is shown. FIG. 3 includes a sectional detail 150 of the toe rollover portion 120. To duplicate the natural wear pattern in an actual shoe, and aluminum horseshoe may be formed using a 3-D milling process to remove material in a series of splines and radii chosen to come as close to the natural shoe wear pattern as possible, as shown in the detail 150. By removing material through such a process, the series of ever-decreasing radii found in test shoes can be readily duplicated. Of course, shoes may be formed through other processes such as forging or cold-forming.

Additionally, it has been determined that a small sample of natural wear patterns (i.e., three or four) may cover the general population at large. Thus, farriers may be provided with a manageable inventory that is appropriate for the majority of the horse population.

FIGS. 1 and 2 also show a side breakover feature 125 and 130 being formed in the left and right braches 110 and 115, respectively. Typically, horseshoes are formed with sharp edges, resulting in the horse having to work harder to breakover the shoe when moving from side to side. The horseshoe of the present disclosure my be formed with the side breakover features 125 and 130 to ease force needed to breakover the shoe in a side movement. The benefit of the side breakover feature is that the ligaments and tendons will be worked less in situations where side-it-side motion is prevalent, such as in cutting horses It is to be understood that the corrective nature of the disclosed horseshoe may be achieved that a wide variety of radii. Thus, any number of radii can be manufactured into the shoe for each feature as needed to correct a particular issue. The desired feature characteristics may be determined by the severity of the problem to be corrected. For example, feature characteristics may be determined by radiographs and/or ultrasound, or by direct observation.

In practice, it is contemplated that the various features and corresponding characteristics of the present disclosure will be chosen so as to balance performance considerations with treatment needs. Less feature radius generally equates to better performance as the shoe will remain in the ground longer, imparting greater forward force. To correct more serious conditions, a greater breakover radius may be indicated.

Thus, discomfort may be reduced while balancing performance considerations using the benefits of this disclosure. A horse may have minor conditions that can be corrected while the horse can be worked as it ages. The horse's collected learning can therefore continue to be harnessed while minor infirmities are correct using the disclosed shoe. For more serious conditions where performance is not an issue, a horse may be made as comfortable as possible.

Figure 4:
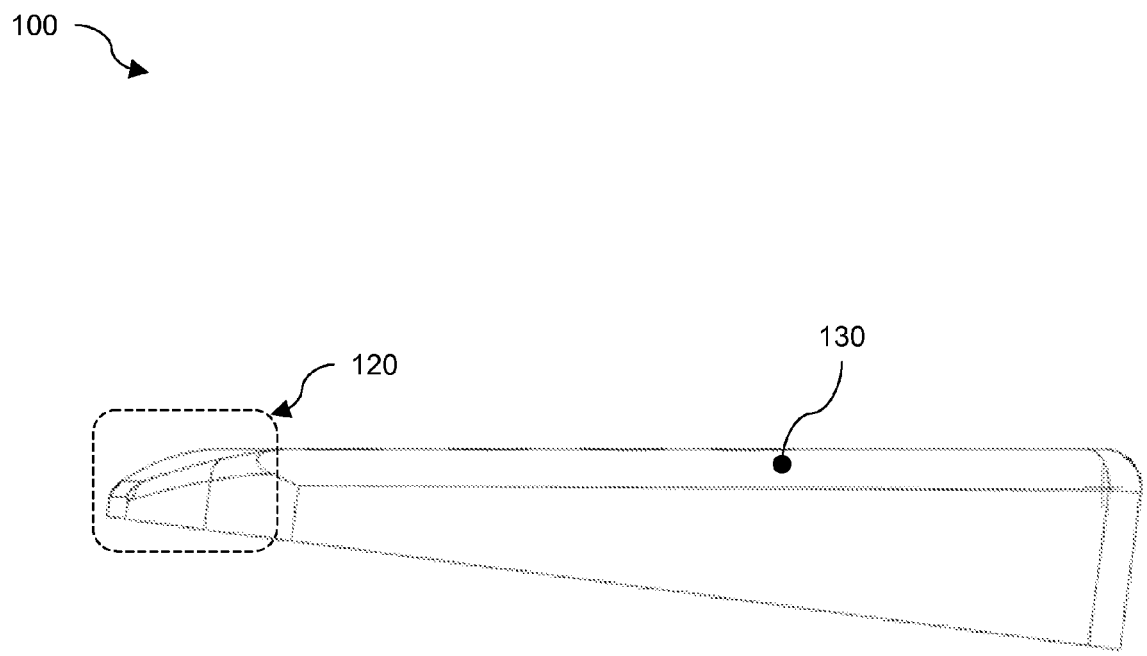
FIG. 4 is a side view of a corrective horseshoe illustrating a wedge angle configured in accordance with the teachings of this disclosure.

FIG. 4 is a side view of a horseshoe 100. The side breakover feature 130 can be seen, as can the toe rollover portion 120. In profile, the shoe 100 of this disclosure may appear to comprise a wedge shape having an angle $\alpha$.

The wedge feature of the present shoe add yet another corrective benefit to the disclosed shoe. An incorrect hoof angle can lead to improper stretching of the horse's tendons and/or ligaments as a result of the hoof to staying in the ground longer. This condition results in the horse having to work harder to overcome the improper angle.

The wedge angle $\alpha$ can be formed at whatever angle necessary to correct the problem presented. It is contemplated that the angle $\alpha$ may be determined by radiograph, or by observation of the confirmation of the horse's shoulders.

The wedge angle $\alpha$ is preferably measured with respect to the angle formed by the angle of the horse's coffin bone and the bottom of the hoof. Alternatively, the angle $\alpha$ may be referenced with respect to the angle formed by the bottom of the hoof and the axis formed by the horse's leg. In preferred embodiments, the angle will generally fall between 1-8°. Negative angles can be present in certain circumstances, such as foundering, where the heel of the hoof grows more slowly than the toe.

Figure 5:
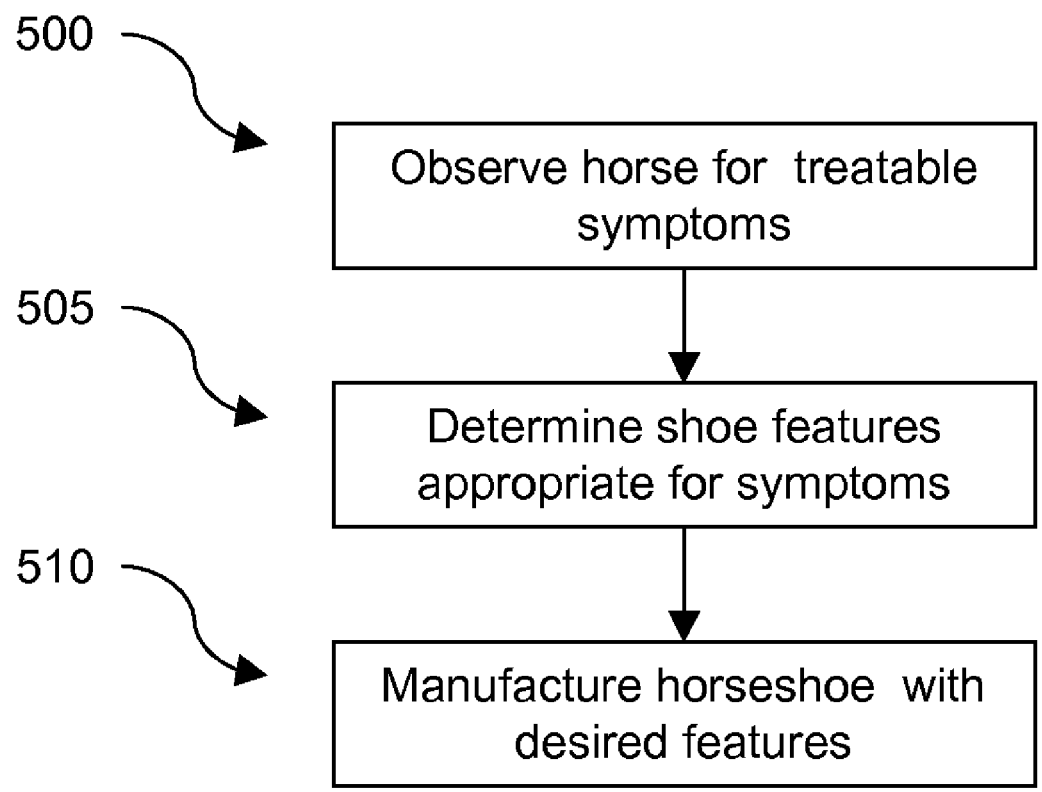
FIG. 5 is a flowchart for forming a corrective horseshoe configured in accordance with the teachings of this disclosure.

Referring now to FIG. 5, a flowchart of a method for determining the corrective features of a horseshoe appropriate for a particular horse. The process begins in act 500, where the horse to be shoed is observed to determine symptoms to be treated with the corrective horseshoe of this disclosure. The horse is preferably observed by qualified personnel such as a farrier or veterinarian. If an injury or disease is found, the type and nature of the injury or disease should be noted. Navicular, suspencory, tendon and ligiment problems, quarter bar cracks, heal corns, low heal, hoof balance are examples of the types of problems that may be corrected or treated with the shoes of this disclosure.

The process continues to act 505, where the corrective features appropriate for the observed symptoms are determined. It is contemplated that a form may be provided to the observer to intake observations relevant to the determination. Characteristics such as nail hole position information and shoe size may be specified.

Corrective features and corresponding feature characteristics may be specified. For example, the form may indicate whether a toe rollover is warranted, and if so, the desired wear pattern. If a side breakover is indicated, a desired radius may be specified. If an angle is indicated, the appropriate angle may be specified.

It is contemplated that the order form may be embodied as a web site where corrective horseshoes may be order online. In such a case, personal information regarding the horse and owner may be stored. Billing and credit card information may be stored in a secure fashion to facilitate secure online financial transactions. Historical observations, such as digitized radiographs, regarding a particular horse may be stored to view past observations and indicated features and characteristics.

The process then moves to act 510, where the shoe is formed in accordance with the order. Thus, in the present disclosure, the order form essentially becomes a prescription for a corrective horseshoe.

In an alternative embodiments, the web site of the present disclosure may assist in determining which corrective features are indicated, and the characteristics appropriate for the indicated features. For example, internal logic may be employed to determine indicated features and characteristics based upon received observations. An interface may be provided that prompt a farrier or veterinarian to provide necessary information. Anatomical figures of the horse may be used to guide the user through the process.

Alternatively, the order process described above may take place either through paper forms or over the phone, or a combination of both. It is contemplated that customers may be charged a price based upon the amount and type of features that are formed in the shoe.

FIGS. 6A-6H are conceptual diagrams of a web-based user interface for facilitating the specification and ordering of a corrective horseshoe in accordance with the teachings of this disclosure.

Figure 6A:
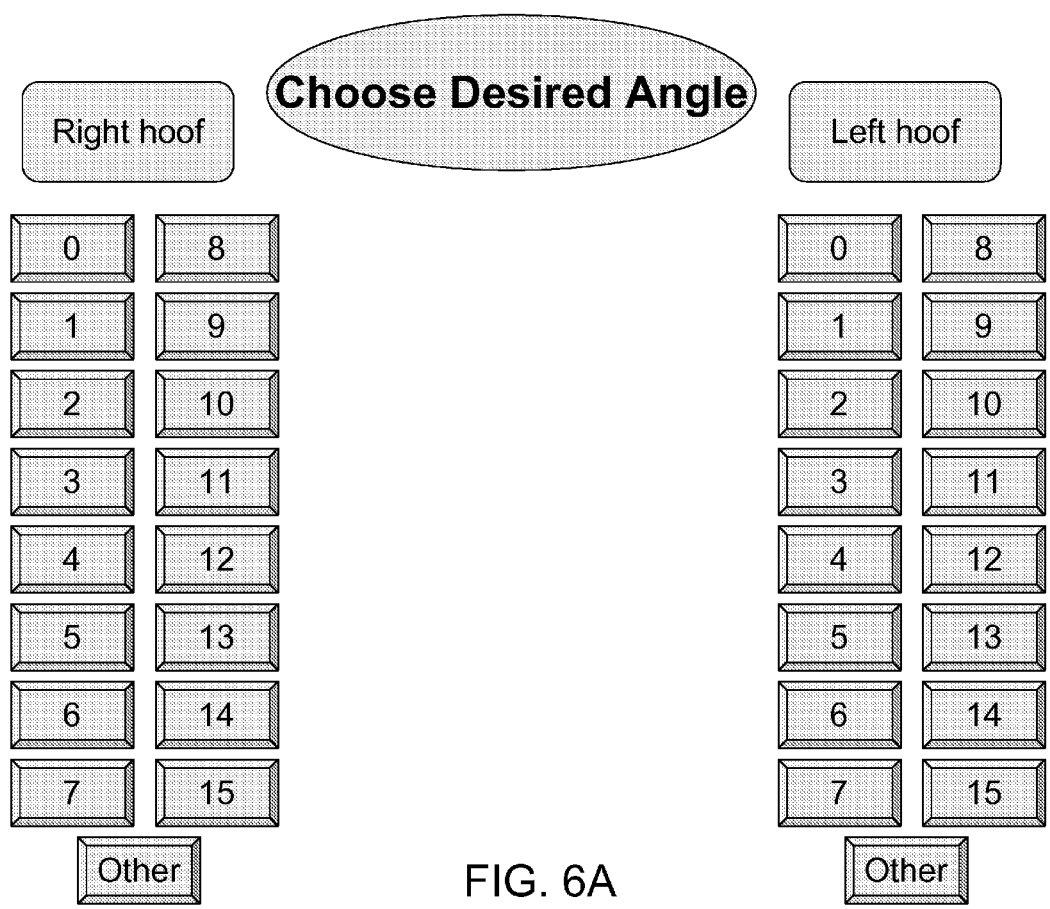
Figure 6B:
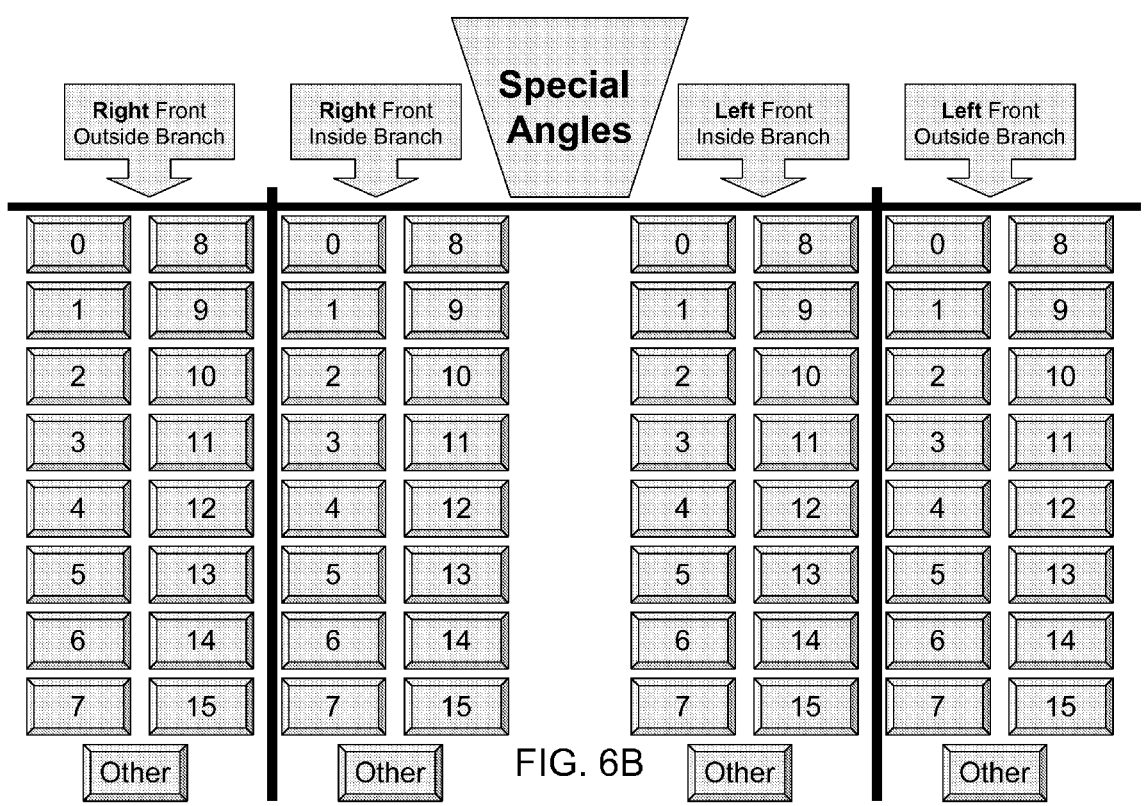

FIG. 6A shows a page for specifying the desired wedge angle feature of the disclosed horseshoe. As can be seen, individual wedge angles may be specified for the left and right shoes. FIG. 6B shows a personal information page illustrating the types of information that may be stored by the site.

Figure 6C:
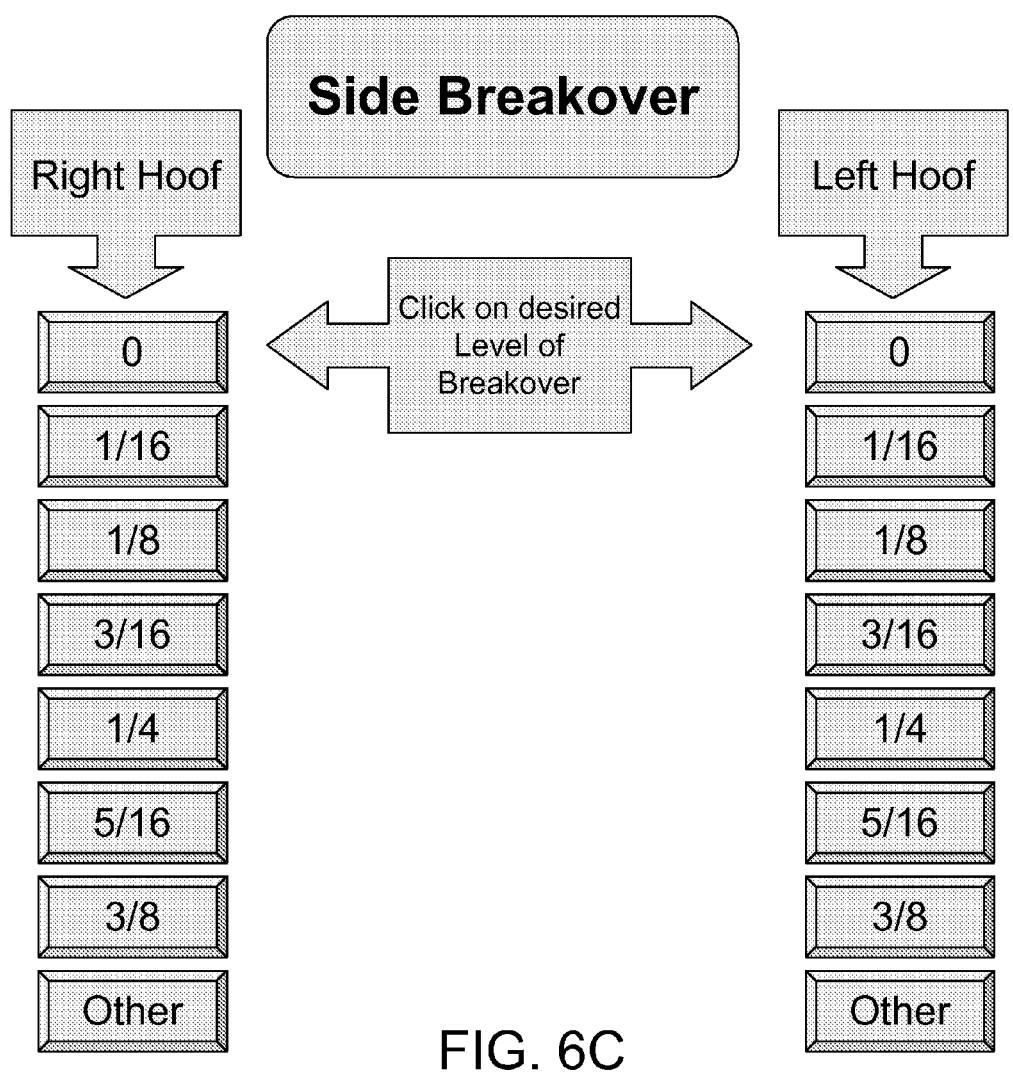

FIG. 6C shows a page for specifying special angles for the branches, providing the ability to put less angle on the inside vs. the outside, or outside vs. inside of the branch.

Figure 6D:
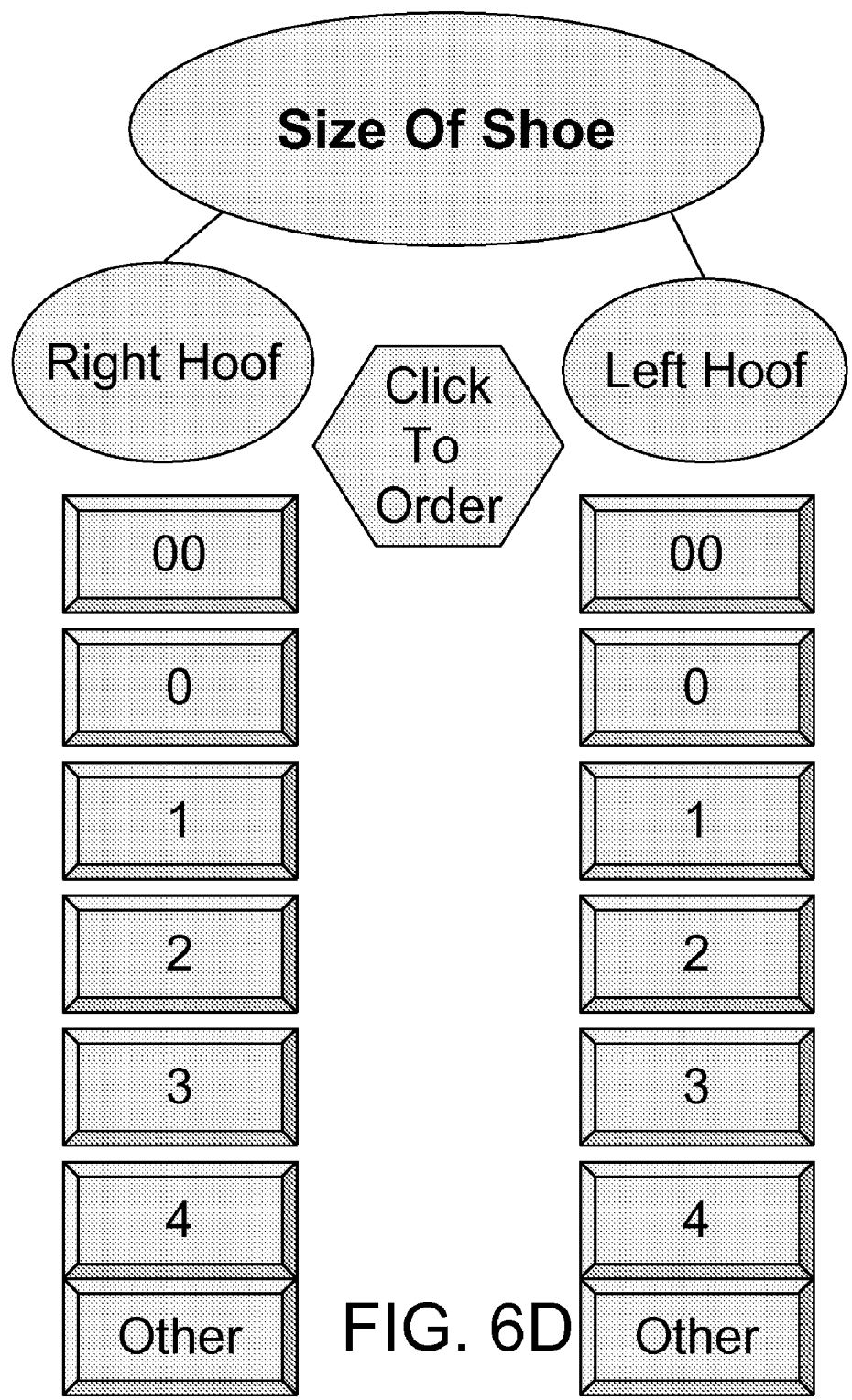
Figure 6E:
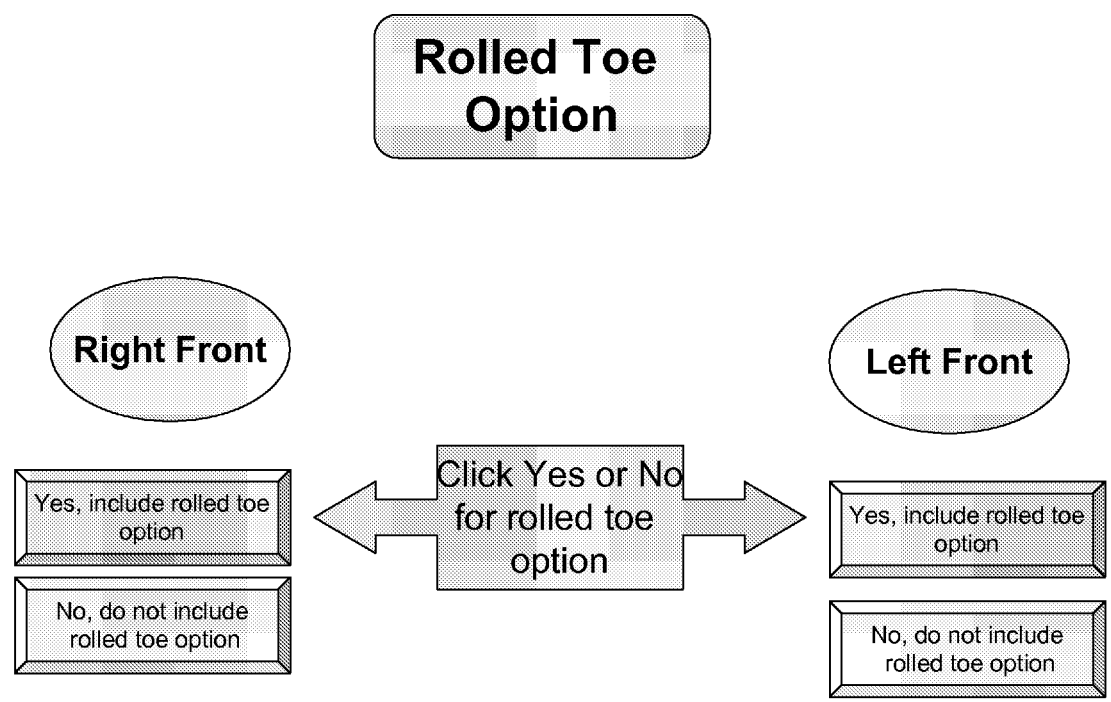
Figure 6F:
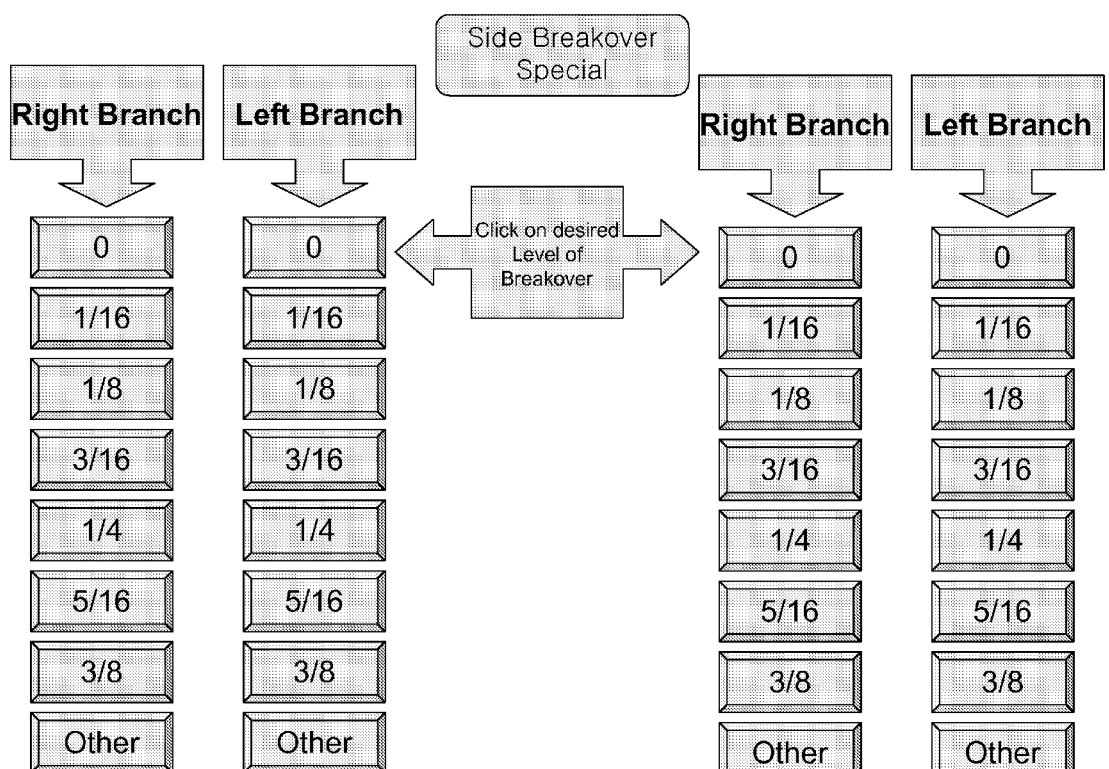

FIG. 6D shows a page for specifying the side rollover feature. Individual radius dimensions may be specified for each shoe. FIG. 6E show a page for specifying the show size for each shoe. FIG. 6F shows a page for indicating whether a toe rollover feature is desired on either shoe.

Figure 6H:
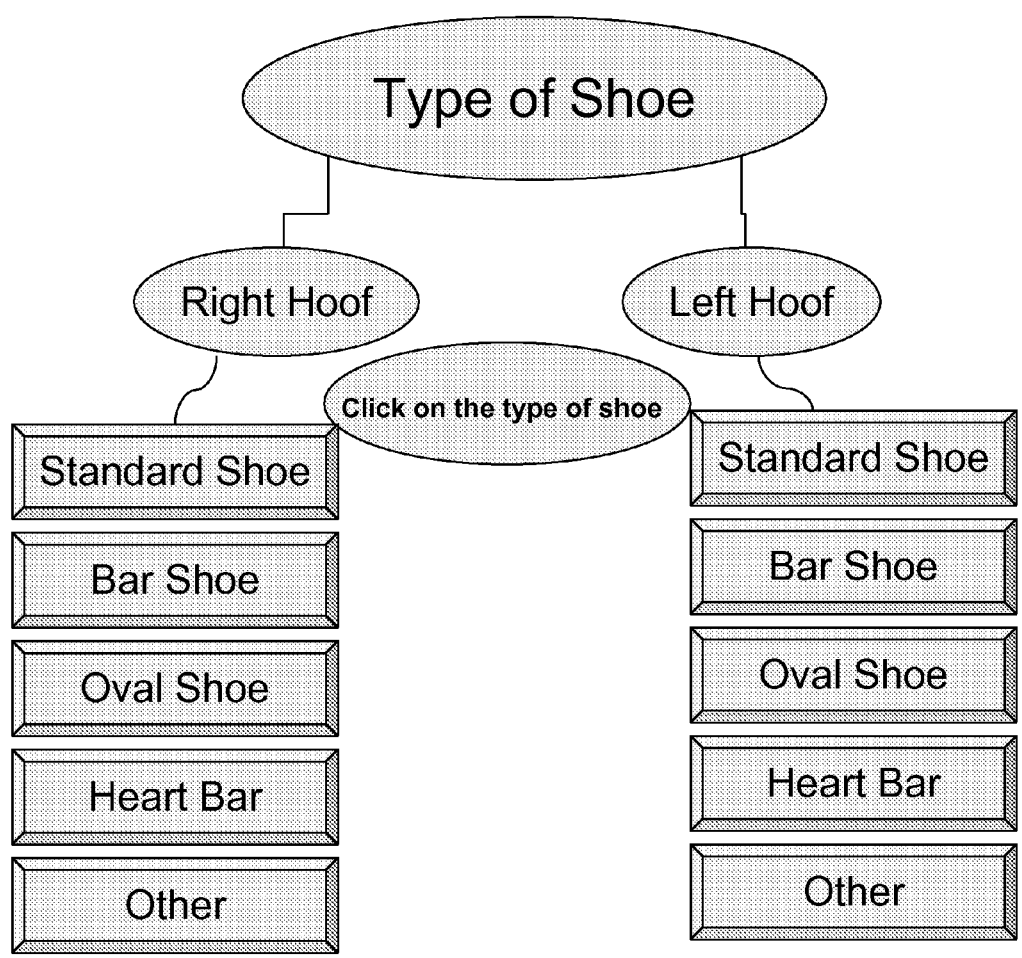

FIG. 6E shows a page for specifying a side rollover feature for each branch of the left and right shoes. Hence, one may order a shoe that includes different breakovers for the inside and outside edges of each shoe. FIG. 6F shows that the shoe may be ordered by providing a used shoe or a drawing. The corrective features of this disclosure may then be specified. FIG. 6H shows a page for specifying the type or shape of the desired shoe. As will be appreciated, one or more of the corrective features may then be specified.

Figure 7:
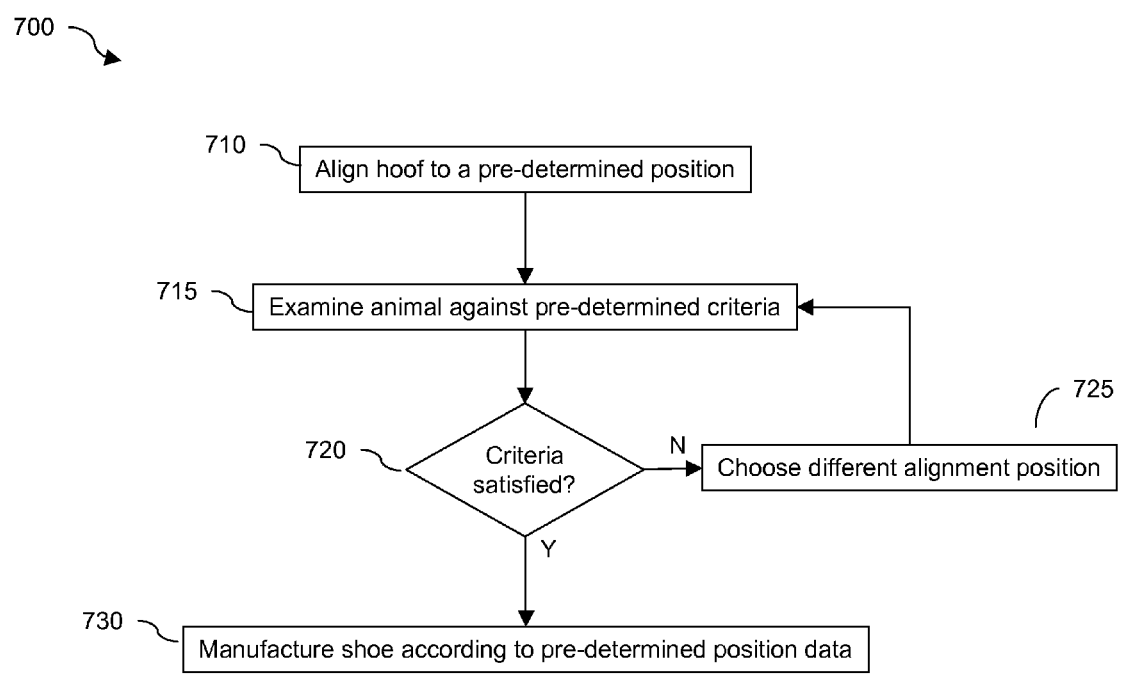
FIG. 7 is a flowchart illustrating a method for optimizing bone structure in accordance with the teachings of this disclosure.

Referring now to FIG. 7, one embodiment of a method 700 for optimizing bone structure in accordance with the teachings of this disclosure is shown. The exemplary embodiment of a method 700 may begin in act 710, where the method then moves to act 710, where the hoof is brought to a pre-determined position. In placing a hoof in a pre-determined position, the associated bone structure is re-aligned in a corresponding alignment. Thus, the hoof is manipulated to align the bone structure to a pre-determined position.

Figure 8:
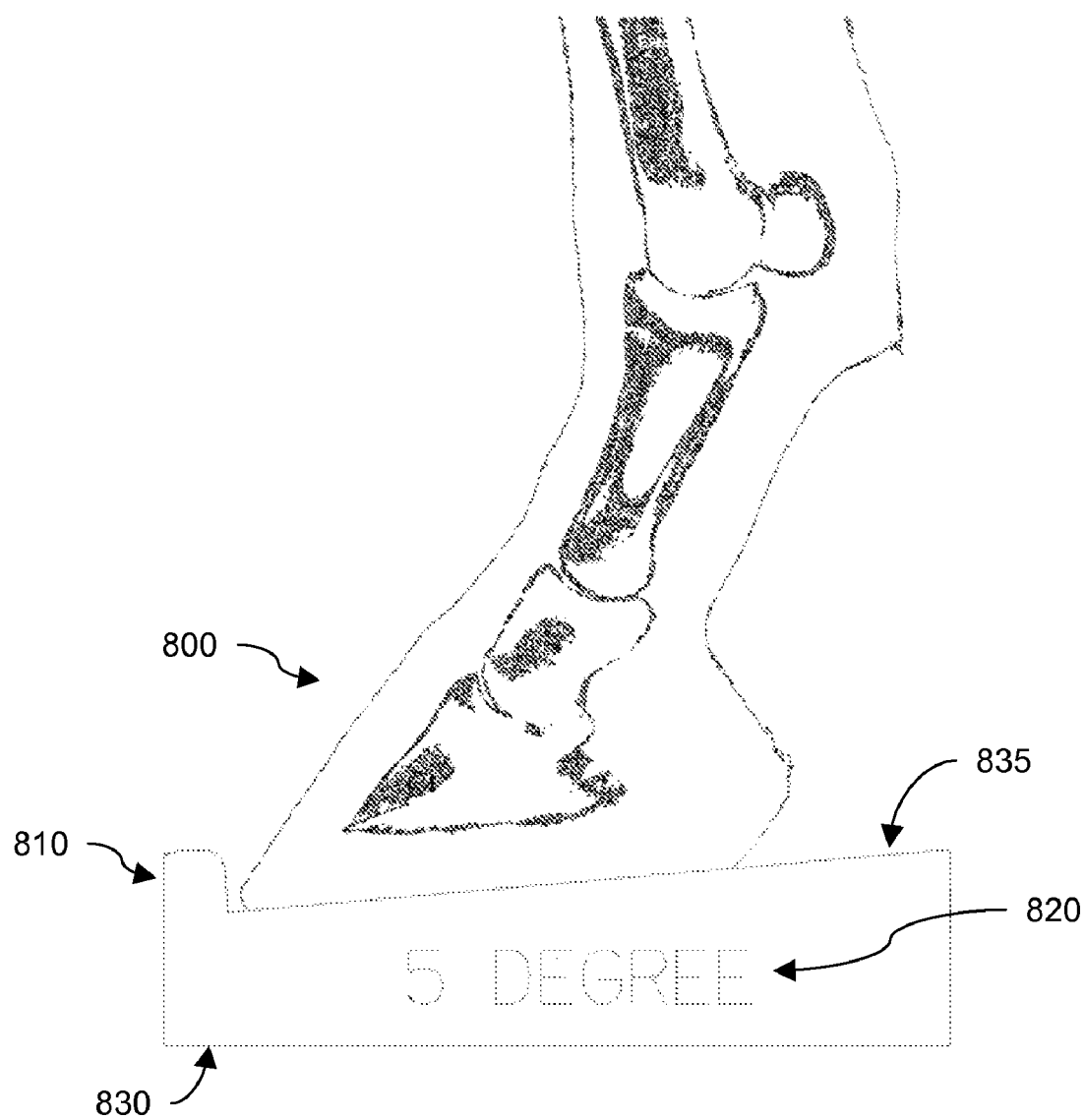
FIG. 8 is a skeletal side view showing one aspect of optimizing bone structure in accordance with the teachings of this disclosure.

Referring briefly to FIG. 8, one embodiment of an alignment procedure is shown. In one embodiment, one or more alignment blocks 810 may be provided upon which an animal's hoof may be placed to bring the hoof to a desired position. It is contemplated that one or more hoofs may be placed on alignment devices simultaneously or as desired. Additionally, it is contemplated that the hoof of the animal may be trimmed to a known state to facilitate a more accurate alignment and diagnosis.

While an alignment block is illustrated in FIG. 8, it is to be understood that the alignment device may comprise any device that will bring the hoof and corresponding bone structure to desired position for observation. In preferred embodiments, a radiograph is taken to observe the resulting bone structure alignment that is achieved when the hoof is aligned in a particular position when on the alignment device. Thus, in FIG. 8, a radiograph may be taken of the lower leg and hoof portion of the animal when the hoof 800 is aligned at a predetermined angle determined by the angle of the top surface 835 of the device 810 relative to the bottom surface 830. It is contemplated that the block 810 may include various indicia 820, such as a code number or indication of the block angle, shown as "5 Degrees" in FIG. 8.

While a mechanical block is illustrated as an alignment device, other embodiments are possible. For example, an adjustable table device may be provided, where a top surface is moveable to predetermined angles as the resulting bone structure is observed. In such embodiments, an indication of the desired angle may be electrically communicated to the web site as disclosed above as position data. Additionally, the desired hoof angle may be determined through the use of measuring devices such as protractors or other measuring devices known in the art. In a further embodiment, a radiograph may be taken of a hoof on a flat surface, and the resulting image examined and or digitally manipulated to determine a proper hoof angle.

It is contemplated that position data may include indications corresponding to the characteristics of the therapeutic features desired in the horseshoe to be manufactured, such that once the bone structure of an animal is compared satisfactorily against a given criteria, a corresponding horseshoe may be manufactured according to the position data.

The position data may be as simple as the indicia stamped on a mechanical block, or may be more complex such as the relative angles of the bones comprising an animal's anatomy, as will be more fully described below. It is contemplated that the position data corresponding to a satisfactory hoof alignment may be readily communicated to the personnel attending to the animal. The position data may then be communicated to manufacture a shoe having the desired therapeutic features as indicated in the position data. As will now be appreciated, once the bone structure of the animal has been successfully determined, the characteristics of the precise shoe to replicate the alignment may be embodied as position data from which a corresponding shoe may be readily manufactured using the processes described herein.

Alternatively, the position data may be communicated directly to a central facility without the intervention of the attending personnel. In such a fashion, the position data will automatically generate the appropriate shoe with little chance for error. The position data may be communicated using electronic means known in the art, such as through the Internet or through wireless means.

Referring back to FIG. 7, the process moves to act 715, where the resulting alignment of the animal's bone structure is examined. In preferred embodiments, the bone structure is compared against a pre-determined desired criteria. Such a determination may be made by the determination of a qualified veterinarian by comparing the resulting bone structure against predetermined criteria, which may vary slightly from animal to animal as all animals of course do not have the same bone structure.

Shown are medial to lateral angles, however it will be appreciated this disclosure may also apply to anterior to posterior observations, or a combination of all of the above. Such a case may result in setting the hoof at compound angles to properly align the bone structure, resulting in a horseshoe having a compound wedge angle, i.e., a shoe exhibiting an angle when viewed head-on. The ability to manufacture a shoe with branches of different thicknesses may result in lessening the need to trim the hoof directly.

Figure 9:
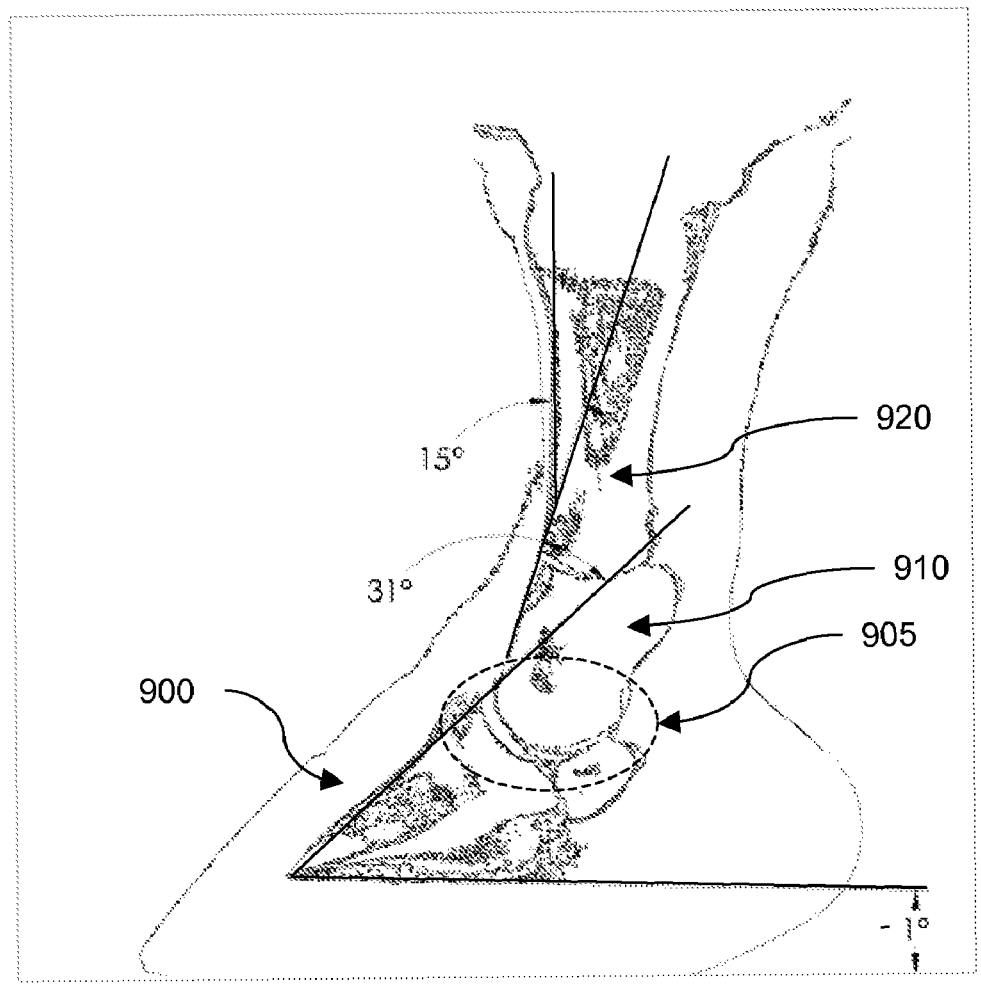
FIG. 9 is a skeletal side view showing bone structure prior to optimization in accordance with the teachings of this disclosure.

Referring now to FIG. 9, a radiograph of the bone structure of an equine digit is shown prior to alignment with the horseshoe of this disclosure. FIG. 9 shows the first phalanx (long pastern bone) 920, the second phalanx (short pastern bone) 910, and the third phalanx (the coffin bone) 900.

It will be appreciated by those of ordinary skill in the art that the arrangement of the bone structure shown on FIG. 9 is not desirable. For example, the radiograph of FIG. 9 indicates a hoof angle of −1° as measured from the bottom of the coffin bone 900 with respect to bottom of the hoof. The second phalanx bone 910 is oriented at an angle of 31° relative to the coffin bone 900, resulting in a misalignment in the coffin bone joint socket 905. Additionally, the first phalanx is oriented at an angle of 15° with respect to the second phalanx.

Figure 10:
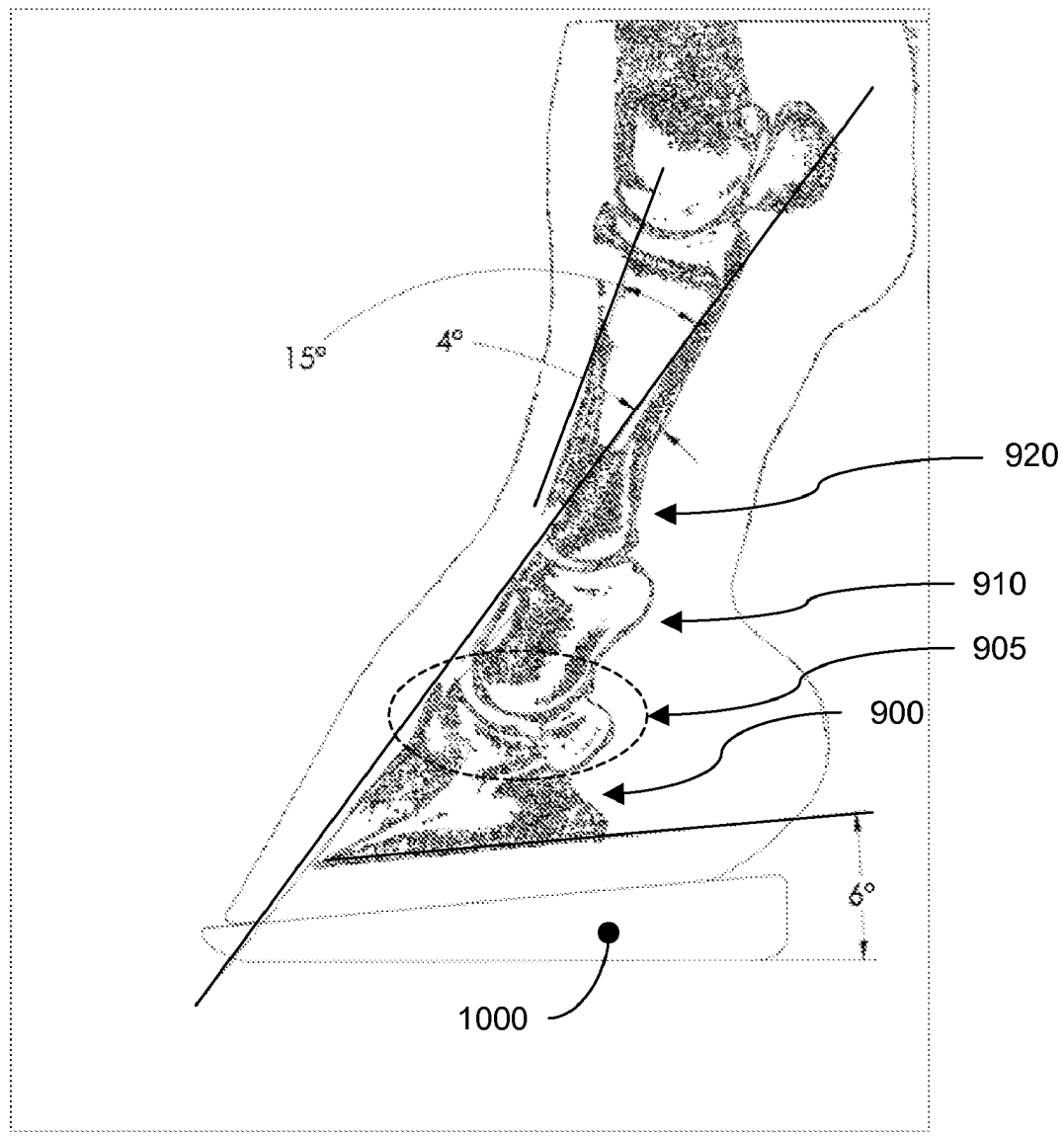
FIG. 10 is a skeletal side view showing optimal bone structure achieved in accordance with the teachings of this disclosure.

In a preferred embodiment, it is desired to have the first, second, and third phalanx bones be aligned such they are substantially parallel. Referring now to FIG. 10, a radiograph of an equine digit is shown while standing on a horseshoe 1000 manufactured in accordance with this disclosure.

As can be seen from FIG. 10, the hoof angle is now a positive 6° using a shoe having a 7° shoe. By so aligning the hoof, the angle between the coffin bone 900 and the second phalanx has been reduced from 31° to 4°, resulting in a much better joint socket fit at the joint 905. Additionally, the angle between the first and second phalanges 920 and 910 has remained at 15°.

Referring back to the process of FIG. 7, a radiograph may be examined in query 720 to determine whether the bone structure is in an ideal alignment. If not, the hoof may be aligned to another position in act 725, and the process repeated until the bones are in an optimal alignment.

When an optimal alignment is found for the particular hoof, a horseshoe may then be manufactured using the position data, such as the wedge angle, that resulted in the desired determined from observing the bone structure alignment.

As can now be seen, a horseshoe can be custom-fitted for a particular horse to achieve an optimal hoof and bone alignment with a high degree of accuracy and repeatability.

While one embodiment is disclosed above wherein the distal phalanges are desired to line up in a relatively parallel fashion, it is to be appreciated that other criteria may be used to choose the various therapeutic features of this disclosure.

While embodiments and applications of this invention have been shown and described, it will now be apparent to those skilled in the art having the benefit of this disclosure that many more modifications than mentioned above are possible without departing from the inventive concepts disclosed herein.

I claim:

1. A method for manufacturing a shoe for an animal comprising:
   aligning the hoof of an animal to a pre-determined position;
   examining the animal against a criteria;
   determining whether the bone structure of the animal satisfies said criteria;
   re-aligning said hoof to a different pre-determined position if said criteria is not satisfied; and
   manufacturing a shoe for said animal according to position data corresponding to a satisfactory position.

2. A method for manufacturing a shoe for an animal comprising:
   aligning the hoof and corresponding bone structure of an animal to a pre-determined position;
   examining the bone structure of the animal against criteria;
   determining whether said bone structure of said animal satisfies said criteria;
   re-aligning said hoof and said corresponding bone structure to a different pre-determined position if said criteria is not satisfied; and
   manufacturing a shoe for said animal according to position data corresponding to a satisfactory position of said hoof and said corresponding bone structure.

* * * * *